Patented Dec. 21, 1943

2,337,103

UNITED STATES PATENT OFFICE 2,337,103

ENAMEL

Werner Heimsoeth, Leverkusen-Wiesdorf, and Robert Weinig, Cologne-Mulheim, Germany; vested in the Alien Property Custodian No Drawing. Application July 13, 1940, Serial No. 345,372. In Germany May 16, 1939

3 Claims. (Cl. 106—48)

The present invention relates to new enamels, and more particularly it relates to new enamels for application to a base metal in which at least a part of the boron compounds usually present is replaced by a titanium compound which forms a clear melt with the other usual constituents of the enamel.

Up to now titanium dioxide has been used in some cases in the enamel industry, to increase the resistance of the enamels to acids. Often also attempts have been made to opacify enamels by means of titanium dioxide or other titanium compounds. For the melting of the titanium in enamels it has been further proposed, to use a sodium titanium silicate instead of titanium dioxide, to facilitate the dissolution of the titanium in the molten enamel and to avoid certain difficulties which appear during the melting of the titanium dioxide. The attempts hitherto made to use titanium compounds in the manufacture of enamels were directed on the one hand to the addition of titanium oxide or other titanium compounds as opacifiers on the mill, thus keeping them in the enamel flux substantially as crystalline substance. On the other hand, one tried to influence the properties of the enamels in a certain direction, in general for increasing the acid resistance, by the admixture of titanious materials to the common enamel raw batch whereby these materials are molten in the enamel.

In accordance with the present invention it has been found, that in enamel batches the boron compounds which are up to now looked upon as essential constituents of the enamels, can be substituted partially or wholly by such titanium compounds as form with the other glass-forming constituents of the enamel batch a clear melt. There have been produced sometimes enamels which are free of boron or contain only little boron whereby the missing boron portion was substituted substantially by metal compounds. Such enamels differ in their properties so materially from the normal borax silicate enamels, that they only can be looked upon as bad substitutes. In accordance with the present invention it is, however, possible to manufacture enamels poor in boron or free of boron, which in fact are not inferior in quality to boron containing enamels.

As the titanium is intended to work as a fluxing material, such compounds come preferably into question which are easily dissolved in the enamel raw batch during melting, i. e. form clear melts with the glass-forming materials. Such compounds are e. g. alkali metal titanium silicates, titanium fluoro compounds and titanates. Preferably sodium titanium silicate corresponding to the formula $Na_2O.TiO_2.SiO_2$ is used. When using this compound it is not necessary to use a compound having the stoichiometric composition, it is, however, preferable to employ compounds of the following composition:

| | Percent |
|---|---|
| Alkali | 20–35 |
| $TiO_2$ | 5–45 |
| $SiO_2$ | 20–60 |

The fusion point of such alkali metal titanium silicates can be lowered by the introduction of certain quantities of alkaline earth metal compounds or of the elements of the 3rd group of the periodic system, suitable in connection with fluorine. As titanates and titanium fluoro compounds preferably compounds of the alkali metals come into consideration, e. g. $Na_2TiO_3$ and $Na_2TiF_6$. But also titanates or titanium fluoro compounds of the alkaline earth metals as well as of coloring elements come into question.

The titanium compounds mentioned serve for a partial or complete substitution of the boron compounds. It is e. g. possible to substitute 50–70%, even also 100% of the borax portion in the enamel mixture by the titanium compounds mentioned without a further alteration of the mixture being necessary. Hereby in general instead of one part of borax about 0.5–0.8 part of alkali metal titanium silicate has to be introduced. By this substitution the gloss and the chemical resistance of the enamels is considerably increased.

EXAMPLE 1.—*White frit*

| | Normal composition | Boron substitution |
|---|---|---|
| Borax | 25.0 | 8.0 |
| Feldspar | 22.4 | 22.4 |
| Quartz | 26.0 | 26.0 |
| Cryolith synth | 12.4 | 12.4 |
| Soda ash | 6.1 | 6.1 |
| Sodium nitrate | 3.0 | 3.0 |
| Calcium carbonate | 5.1 | 5.1 |
| Sodium titanium silicate | | 10.0 |
| | 100.0 | 94.0 |

In a similar manner also the alkali metal titanates and alkali metal fluorides are suitable for the substitution of the borax without further alteration.

EXAMPLE 2.—*Ground coat*

|  | Normal composition | Boron substitution |
|---|---|---|
| Quartz | 12.0 | 12.0 |
| Feldspar | 37.5 | 37.5 |
| Borax | 38.0 | 20.0 |
| Soda ash | 6.0 | 0.8 |
| Sodium nitrate | 2.0 | 2.0 |
| Fluor spar | 3.3 | 3.3 |
| Nickel oxide | 0.6 | 0.6 |
| Cobalt oxide | 0.2 | 0.2 |
| Pyrolusite | 0.4 | 0.4 |
| $Na_2TiF_6$ | | 10.0 |
|  | 100.0 | 94.0 |

The melting of the enamels according to these compositions as well as the further working up is effected in the usual way.

An enamel completely free of boron will be obtained in accordance with the following example:

EXAMPLE 3.—*Black frit free of boron*

| Quartz | 40.3 |
|---|---|
| Feldspar | 11.4 |
| Soda ash | 13.7 |
| Sodium nitrate | 3.4 |
| Barium carbonate | 3.4 |
| Fluor-spar | 3.4 |
| Pyrolusite | 1.7 |
| Cobalt oxide | 1.1 |
| Strontium fluoride | 3.4 |
| Zinc oxide | 5.7 |
| Black pigment (product usual in commerce consisting of strongly calcined oxides of Co, Mn, Fe, Cr) | 3.4 |
| Sodium titanium silicate | 9.1 |
|  | 100.0 |

Also such mixtures free of boron are worked up in the usual manner and yield enamels which are distinguished by a particularly pleasing coloration, high gloss and considerable resistance to acids.

We claim:

1. An enamel of the boro-silicate type having the following composition in parts by weight:

| Borax | 8 |
|---|---|
| Feldspar | 22.4 |
| Quartz | 26.0 |
| Cryolite | 12.4 |
| Soda ash | 6.1 |
| Sodium nitrate | 3.0 |
| Calcium carbonate | 5.1 |
| Sodium titanium silicate | 10.0 |

2. An enamel of the boro-silicate type having the following composition in parts by weight:

| Quartz | 12.0 |
|---|---|
| Feldspar | 37.5 |
| Borax | 20.0 |
| Soda ash | .8 |
| Sodium nitrate | 2.0 |
| Fluor-spar | 3.3 |
| Nickel oxide | 0.6 |
| Cobalt oxide | 0.2 |
| Pyrolusite | 0.4 |
| $Na_2TiF_6$ | 10.0 |

3. An enamel of the boro-silicate type having the following composition, in parts by weight:

| Quartz | 40.3 |
|---|---|
| Feldspar | 11.4 |
| Soda ash | 13.7 |
| Sodium nitrate | 3.4 |
| Barium carbonate | 3.4 |
| Fluor-spar | 3.4 |
| Pyrolusite | 1.7 |
| Cobalt oxide | 1.1 |
| Strontium fluoride | 3.4 |
| Zinc oxide | 5.7 |
| Black pigment | 3.4 |
| Sodium titanium silicate | 9.1 |

WERNER HEIMSOETH.
ROBERT WEINIG.